United States Patent [19]
Boley et al.

[11] Patent Number: 4,621,854
[45] Date of Patent: Nov. 11, 1986

[54] DEVICE FOR CHANGING TOOLS IN INDUSTRIAL ROBOTS

[75] Inventors: Dieter Boley, Leonberg; Egon Illig, Stuttgart; Wolfgang Sturz, Sindelfingen, all of Fed. Rep. of Germany

[73] Assignee: C. & E. Fein GmbH & Co., Stuttgart, Fed. Rep. of Germany

[21] Appl. No.: 761,914

[22] Filed: Aug. 2, 1985

[30] Foreign Application Priority Data

Sep. 11, 1984 [DE] Fed. Rep. of Germany ....... 3433311

[51] Int. Cl.⁴ .............................................. B25J 15/00
[52] U.S. Cl. .................................. 294/88; 294/82.31; 294/86.4; 294/104; 901/31; 901/36
[58] Field of Search ................. 294/82.1, 82.24, 82.26, 294/82.3-82.32, 86.4, 88, 103.1, 104; 414/741, 739; 901/30, 31, 37, 39, 41-43, 50

[56] References Cited

U.S. PATENT DOCUMENTS

| | | | |
|---|---|---|---|
| 2,910,321 | 10/1959 | Sehn et al. | 294/88 |
| 3,039,811 | 6/1962 | Bradley et al. | 294/88 X |
| 3,690,713 | 9/1972 | Ristow | 294/82.31 |
| 3,792,782 | 2/1974 | Melton | 294/103.1 X |
| 4,257,639 | 3/1981 | Stock | 294/82.26 |
| 4,441,674 | 4/1984 | Holtrop | 294/82.26 X |
| 4,545,723 | 10/1985 | Clark | 901/50 X |

FOREIGN PATENT DOCUMENTS

| | | | |
|---|---|---|---|
| 1093548 | 5/1984 | U.S.S.R. | 294/86.4 |
| 1115991 | 9/1984 | U.S.S.R. | 294/82.31 |

*Primary Examiner*—Johnny D. Cherry
*Attorney, Agent, or Firm*—Max Fogiel

[57] ABSTRACT

A device for changing tools, pick-ups, welding torches, and other implements that can be handled by industrial robots. It consists of an upper and lower part. In order to obtain optimal cost effectiveness a linear drive mechanism guides a hook-shaped structure in the upper part along a guide in such a way that the structure initially carries out a curved motion essentially perpendicular to the linear closing or opening motion during the closure process. The curved motion is appropriate for making the bottom of the device engage an associated implement even when the latter is stored in an imprecise position. The structure then carries out a strictly linear motion during which the upper part and lower part are exactly aligned by guides integrated into the device and by guide bevels even in the presence of counteracting forces. A motion that can be made as precise as desired can be executed to obtain a closed and mechanically prescribable final position. The aforesaid linear drive mechanism can also be employed for purposes of separation in conjunction with an ejector while the device is opening, even in the presence of counteracting reaction forces.

9 Claims, 12 Drawing Figures

DEVICE FOR CHANGING TOOLS IN INDUSTRIAL ROBOTS

BACKGROUND OF THE INVENTION

The present invention relates to a device for changing tools, pick-ups, welding torches, and other implements that can be handled by industrial robots. It represents an interface between the implement and the flange of the robot.

Such an implement-changing device consists of two parts that become an upper and a lower part when the device is opened. The upper part remains on the robot and the lower part is replaced, with the original going into a bin associated with the device. The aforementioned implements, the pick-ups etc, are mounted on the lower parts.

Various types of devices for changing tools in industrial robots are known. They work in accordance with various tensioning principles and are frequently designed to function only in special applications. Since they allow only very specific operations with respect to the transmission of power and signals they can not be extended in relation to electrical plugs, compressed-air transmission elements, etc. as desired without expensive mechanical modifications and they also require that the robot itself connect the elements that transmit the power and signals itself as a result of its own motion during the closure process. This demands precise and time-consuming programming to obtain a robot that can apply the necessary force without giving way significantly as well as very accurate centering of the part to be picked up from a storage container. Furthermore, it is impossible to ensure reliable opening of the implement-changing device by separating the upper and lower parts without considerable expense, which is incurred either by an additional operating element like a spring, a compressed-air cylinder, etc. or by securing the lower part of the device in the bin.

SUMMARY OF THE INVENTION

The object of the present invention is to provide a device for changing tools, pick-ups, welding torches, and other implements that can be handled by industrial robots, which consists of an upper and lower part, and which exploits a new principle to obtain optimal cost effectiveness.

This object is attained in accordance with the invention in that a linear drive mechanism guides a hook-shaped structure in the upper part along a guide in such a way that the structure initially carries out a curved motion essentially perpendicular to the linear closing or opening motion during the closure process, the curved motion being appropriate for making the bottom of the device engage an associated mate even when the latter is stored in an imprecise position, and the structure then carries out a strictly linear motion during which the upper part and lower part are exactly aligned by guides integrated into the device and by guide bevels even in the presence of counteracting forces, in that a motion that can be made as precise as desired can be executed to obtain a closed and mechanically prescribable final position, and in that the aforesaid linear drive mechanism can also be employed for purposes of separation in conjunction with an ejector while the device is opening even in the presence of counteracting reaction forces. The drive mechanism can be a spring that is tensioned by a compressed-air cylinder. The drive mechanism can be a double-action compress-air cylinder. The operating power can be hydraulic. An electric linear drive mechanism can be employed to obtain linear motion. A rotating drive mechanism with a rotating-to-linear transmission can alternatingly be used to obtain linear motion. The linear motion can then be employed while the device is opening and closing to connect and disconnect plugs that transmit signals and (electric, pneumatic, or hydraulic) power. The device can be designed to be appropriate for connecting parts that required directed travel while the device is opening and closing.

A preferred embodiment of the invention will now be described with reference to the attached drawings, wherein:

DESCRIPTION OF THE PREFERRED EMBODIMENT

Figure 1:
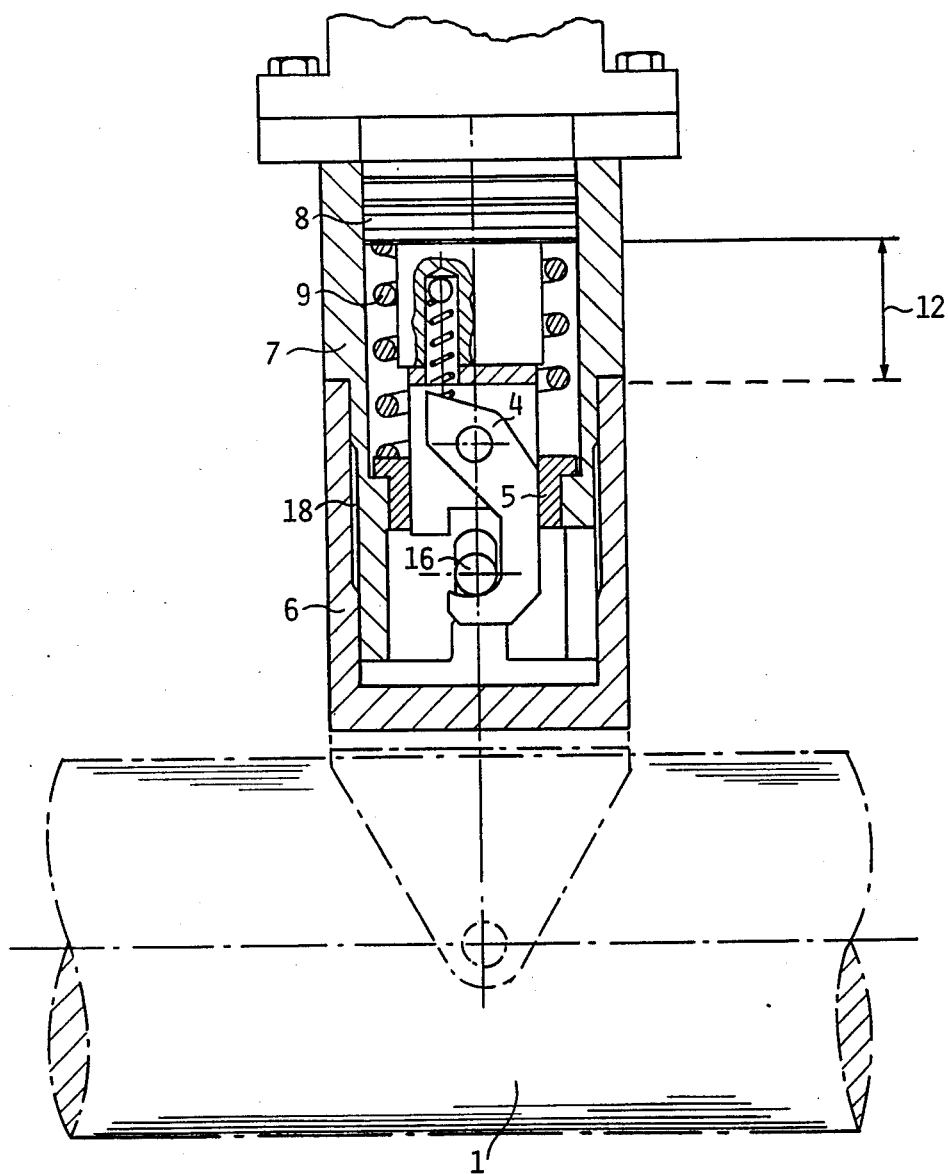
FIG. 1 is a section through the device with both parts connected.
Figure 2A:
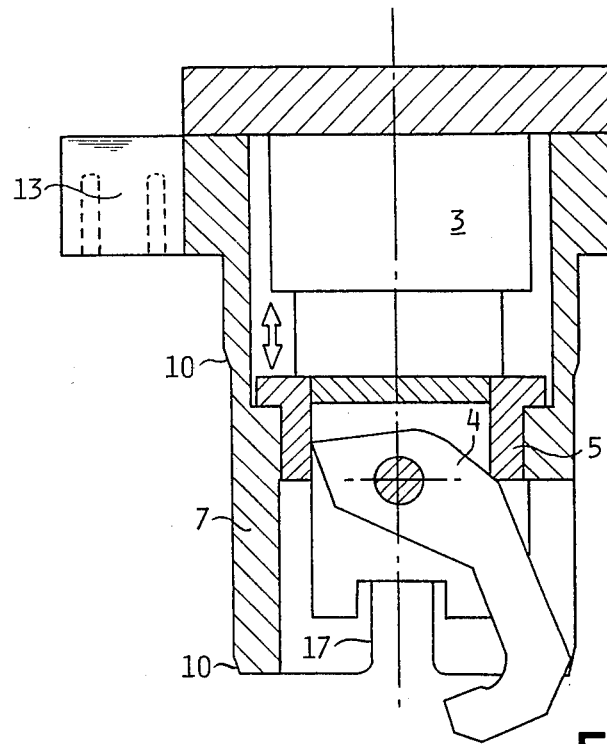
FIG. 2a is a section through the upper part alone.
Figure 2B:
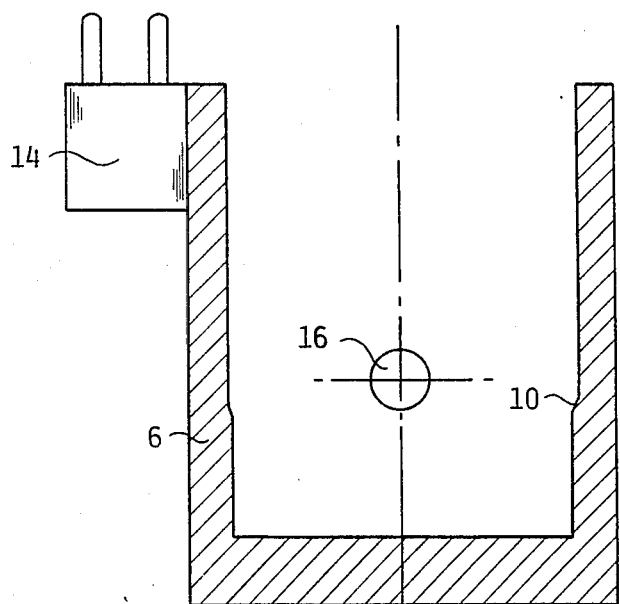
FIG. 2b is a section through the lower part alone.
Figure 3A:
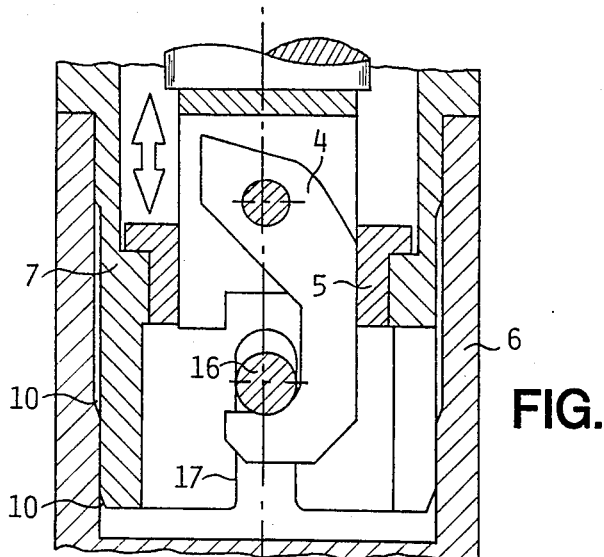
FIGS. 3a–3c illustrate the structure that connects and separates upper and lower parts in various operating positions during opening motion.
Figure 3B:
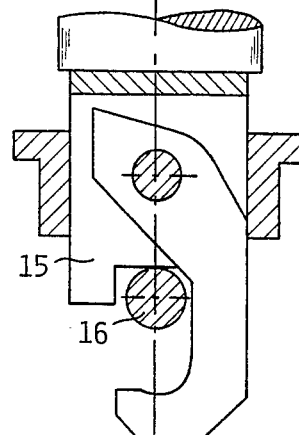
Figure 3C:
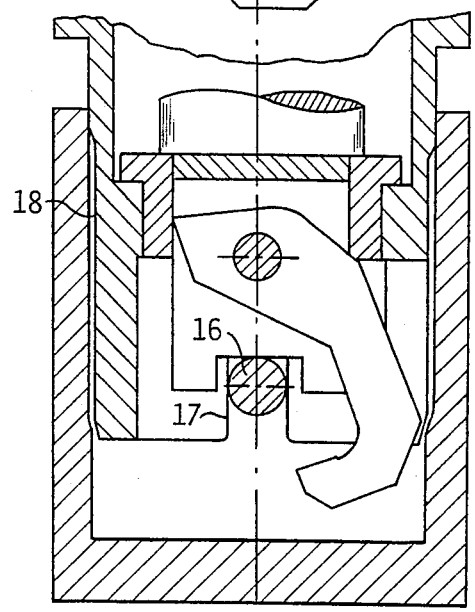
Figure 4A:
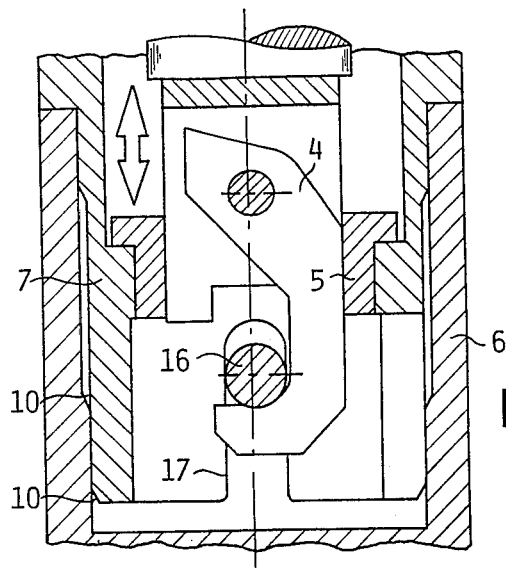
FIGS. 4a–4c illustrate the operating parts in FIGS. 3a–3c during closing motion.
Figure 4B:
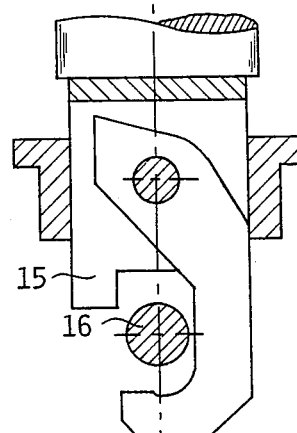
Figure 4C:
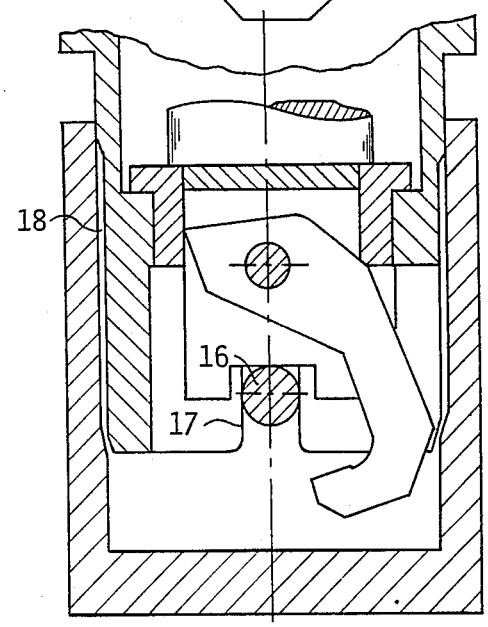

A drive mechanism 3 that produces a linear motion has a hook-shaped structure 4 that is forced along a guide 5 and channeled accordingly and that engages the lower part of the tool-changing device illustrated in FIG. 2b at bolt 16 and forces it against the upper part 7 illustrated in FIG. 2a. Drive mechanism 3 can for example be a spring 9 that is tensioned by a compressed-air cylinder 8 (FIG. 1). The guide bevels 10 on the upper and lower parts 6, 7 and guides 17, 18 make a very coarse positioning of the robot arm above a lower part resting in a storage bin enough to ensure satisfactory engagement. Drive mechanism 3, which produces the linear motion, can insure that the travel 12 of hook-shaped structure 4 will be as long as desired. This will simultaneously, while the two parts are engaging, connect any connecting elements like plugs, compressed-air connections, etc. that are mounted on the upper and lower parts, that consist of an upper component 13 and a bottom component 14, and that demand externally guided insertion. A channel of the requisite length can be obtained by varying the tolerance between the upper and lower parts of the device.

Figure 6:
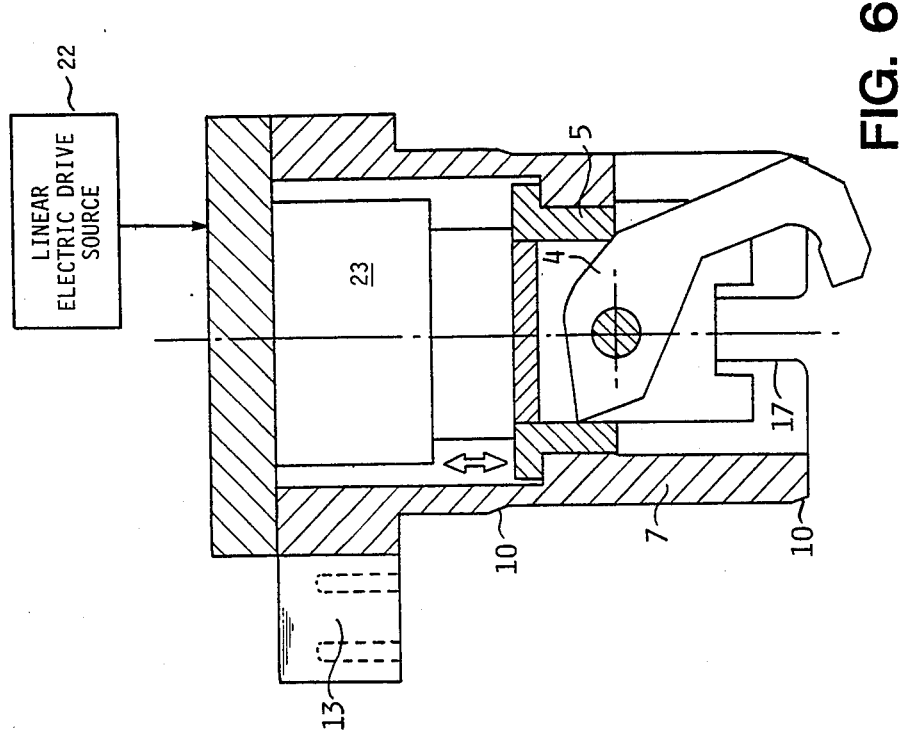
FIG. 6 shows the drive mechanism in FIG. 2a in the form of a linear electric drive.
Figure 5:
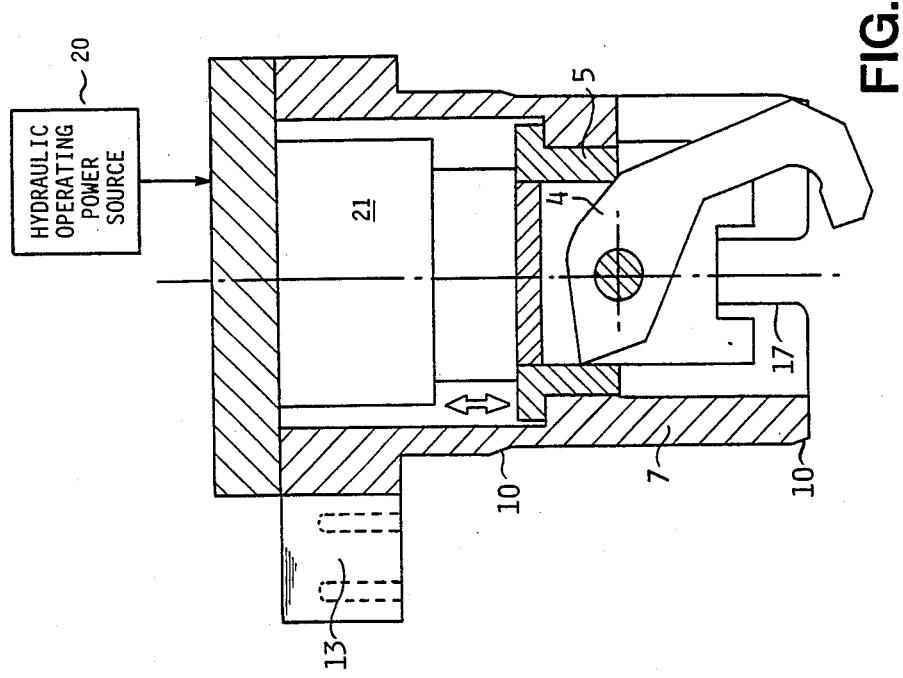
FIG. 5 shows the drive mechanism of FIG. 2a in the form of a hydraulic operating device.
Figure 7:
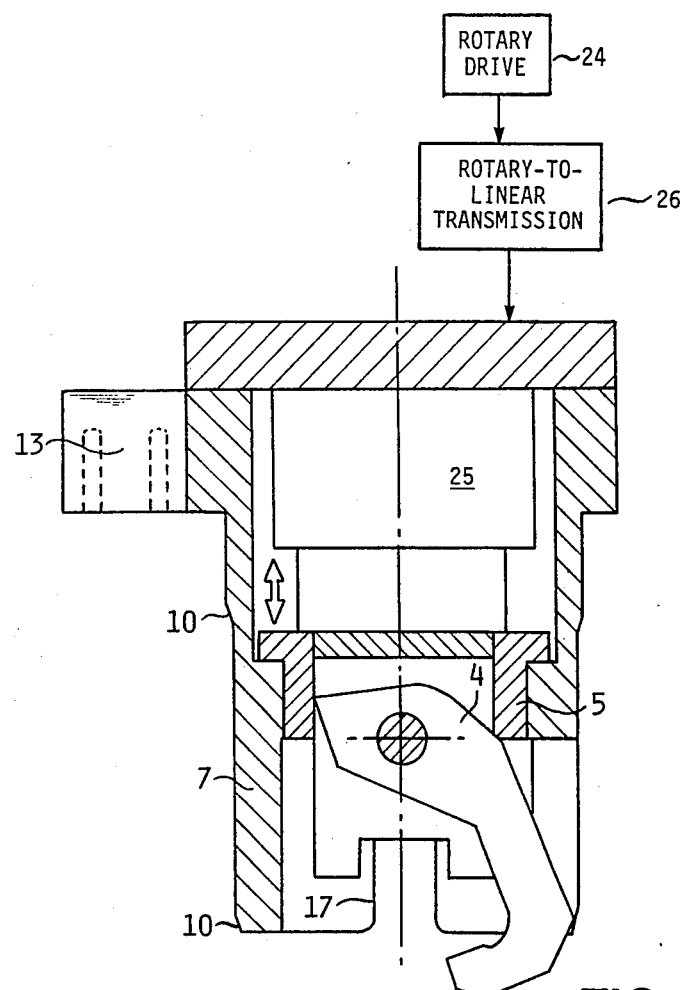
FIG. 7 shows the drive mechanism in FIG. 2a in the form of a rotary drive with a rotary-to-linear transmission.

The drive mechanism can also be in the form of a hydraulic unit 21 with a hydraulic operating source 20, or an electric drive 23 with a linear electric drive source 22. Furthermore, the drive mechanism can be in the form of a rotary drive 24 with a rotary-to-linear transmission unit. These are shown in FIGS. 5, 6, and 7, respectively.

The third essential advantage of the invention is the potential for actively separating the upper and lower parts by means of the same drive mechanism 3 employed to bring them together. This is done with an ejector 15. No additional mechanisms are necessary. During the release operation, ejector 15 presses against the bolt 16 that is engaged by hook-shaped structure 4 during closure. The large power-transmission components 13 and 14 necessitate not only high insertion forces but also considerable separation forces. They can accordingly come directly into application with this device.

We claim:

1. A device for changing tools, pick-ups, welding torches, and other articles that can be handled by industrial robots, comprising: a first part on side of a robot; a second part on side of a tool; closure means having drive means; pivotable spring-loaded hook-shaped means connected to said drive means and movable in axial direction of said drive means; guide means surrounding at least partially said hook-shaped means and movable in direction toward said second part; bolt means attached to said second part and graspable by said hook-shaped means; guide means on said first and second parts; and ejector means on said drive means for separating said parts.

2. A device as defined in claim 1, wherein said drive means comprises a spring tensioned by a compressed-air cylinder.

3. A device as defined in claim 1, wherein said drive means comprises a double-action compressed-air cylinder.

4. A device as defined in claim 1, including a hydraulic operating power source.

5. A device as defined in claim 1, wherein said drive means comprises electric drive means for obtaining linear motion.

6. A device as defined in claim 1, wherein said drive means comprises a rotating drive with rotating-to-linear transmission means for obtaining linear motion.

7. A device as defined in claim 1, including plug connector means for transmitting signals and power, said drive means having linear motion occurring when the device is opening and closing to connect and disconnect said plug connector means.

8. A device as defined in claim 1, including means for connecting parts requiring directed travel while the device is opening and closing.

9. A device for changing tools, pick-ups, welding torches, and other articles that can be handled by industrial robots, comprising: an upper and a lower part; a hook-shaped means in said upper part and moved along a guide; linear drive means guiding said hook-shaped means along said guide so that said hook-shaped means initially carries out a curved motion substantially perpendicular to linear closing or opening motion during a closure process, said curved motion engaging a bottom portion of the device with a mating member even when said mating member is stored in an imprecise position, said hook-shaped means being pivoted at a single point fixed to said drive means; motion of said hook-shaped means being produced by pressing against said guide; guide means for aligning said upper part and said lower part and being integral with the device, said hook-shaped means carrying out additionally a linear motion during which said upper part and said lower part are substantially precisely aligned by said guide means even in the presence of counteracting forces, said linear motion being executed to obtain a closed and predetermined final position; and an ejector on said linear drive means for separation of said parts while the device is opening even in the presence of counteracting reaction forces.

* * * * *